US009796896B2

(12) United States Patent
Lynch et al.

(10) Patent No.: US 9,796,896 B2
(45) Date of Patent: Oct. 24, 2017

(54) FERTILIZER AND FERTILIZER ADDITIVE COMPOSITIONS AND METHODS COMPRISING BY-PRODUCTS FROM THE MANUFACTURE OF FATTY ACID ALKYL ESTERS AND/OR BIODIESEL

(71) Applicants: Joan Lynch, Chicago, IL (US); Bo Tran, Chicago, IL (US)

(72) Inventors: Joan Lynch, Chicago, IL (US); Bo Tran, Chicago, IL (US)

( * ) Notice: Subject to any disclaimer, the term of this patent is extended or adjusted under 35 U.S.C. 154(b) by 0 days.

(21) Appl. No.: 13/725,557

(22) Filed: Dec. 21, 2012

(65) Prior Publication Data

US 2013/0160506 A1    Jun. 27, 2013

Related U.S. Application Data

(60) Provisional application No. 61/578,792, filed on Dec. 21, 2011.

(51) Int. Cl.

| C09K 5/10 | (2006.01) |
|---|---|
| C05C 11/00 | (2006.01) |
| C05C 3/00 | (2006.01) |
| C05F 11/00 | (2006.01) |
| C05G 3/00 | (2006.01) |
| H01B 3/20 | (2006.01) |

(52) U.S. Cl.
CPC ............. *C09K 5/10* (2013.01); *C05C 3/005* (2013.01); *C05C 11/00* (2013.01); *C05F 11/00* (2013.01); *C05G 3/00* (2013.01); *H01B 3/20* (2013.01); *Y02E 50/343* (2013.01); *Y02W 30/47* (2015.05)

(58) Field of Classification Search
CPC . C05C 11/00; C05C 3/05; C05F 11/00; C05G 3/00; C09K 5/10; H01B 3/20; Y02W 30/47; Y02E 50/343
USPC .................. 71/11–26, 64.01–64.13
See application file for complete search history.

(56) References Cited

U.S. PATENT DOCUMENTS

| 4,117,214 A | 9/1978 | Parks et al. |
|---|---|---|
| 4,304,636 A | 12/1981 | Kestner et al. |
| 4,388,203 A | 6/1983 | Nimerick et al. |
| 4,417,992 A | 11/1983 | Bhattacharyya et al. |
| 4,426,409 A | 1/1984 | Roe |
| 4,439,337 A | 3/1984 | Nimerick et al. |
| 4,450,046 A | 5/1984 | Rice et al. |
| 4,594,268 A | 6/1986 | Kirwin |
| 4,689,251 A | 8/1987 | Newman et al. |
| 5,079,036 A | 1/1992 | Roe et al. |
| 5,104,711 A | 4/1992 | Marsek |
| 5,177,008 A * | 1/1993 | Kampen ............ C12F 3/10 435/139 |
| 5,188,750 A | 2/1993 | Kogure et al. |
| 5,194,174 A | 3/1993 | Roe et al. |
| 5,244,472 A | 9/1993 | Simmons |
| 5,421,835 A | 6/1995 | Harding |
| 5,431,702 A | 7/1995 | Schulz |
| 5,435,813 A | 7/1995 | Evans |
| 5,439,608 A | 8/1995 | Kondrats |
| 6,039,890 A | 3/2000 | Ossian et al. |
| 6,129,857 A | 10/2000 | Sapienza |
| 6,137,294 A | 10/2000 | Best et al. |
| 6,294,104 B1 | 9/2001 | Ilves et al. |
| 6,315,919 B1 | 11/2001 | Sapienza |
| 6,491,736 B1 | 12/2002 | Bell et al. |
| 6,506,318 B1 | 1/2003 | Sapienza et al. |
| 6,544,434 B2 | 4/2003 | Sapienza |
| 6,589,442 B1 | 7/2003 | Wilson et al. |
| 6,818,027 B2 | 11/2004 | Murcia |
| 6,843,961 B2 | 1/2005 | Hlavinka et al. |
| 6,878,308 B2 | 4/2005 | Schilling |
| 6,890,451 B2 | 5/2005 | Sapienza et al. |
| 7,105,105 B2 | 9/2006 | Samuels et al. |
| 7,108,800 B2 | 9/2006 | Tran et al. |
| 7,126,032 B1 | 10/2006 | Aiken |
| 7,147,679 B2 | 12/2006 | Donovan et al. |
| 7,195,656 B2 | 3/2007 | Appleby et al. |
| 7,398,935 B2 | 7/2008 | Tran et al. |
| 2001/0023653 A1 | 9/2001 | Langford |
| 2001/0042340 A1 | 11/2001 | Tateno et al. |
| 2002/0184933 A1 | 12/2002 | Bell, III et al. |
| 2004/0159042 A1 | 8/2004 | Murcia |
| 2005/0055873 A1 | 3/2005 | Murcia |
| 2005/0087720 A1 | 4/2005 | Samuels et al. |
| 2005/0142250 A1 | 6/2005 | Garwood |
| 2005/0253109 A1 | 11/2005 | Tran et al. |
| 2006/0284137 A1 | 12/2006 | Tran et al. |
| 2008/0005956 A1 | 1/2008 | Tran |
| 2008/0115409 A1 | 5/2008 | Tran |
| 2008/0190160 A1 * | 8/2008 | Tran et al. ............... 71/25 |
| 2010/0071428 A1 * | 3/2010 | Waldron et al. .......... 71/9 |
| 2011/0088312 A1 * | 4/2011 | Velasco Alvarez ...... C12N 1/32 44/385 |
| 2012/0316320 A1 * | 12/2012 | Calt, Jr. ........... C12M 21/04 530/350 |
| 2013/0160506 A1 * | 6/2013 | Lynch et al. .............. 71/25 |

FOREIGN PATENT DOCUMENTS

| EP | 0 195 638 B1 | 6/1991 |
|---|---|---|
| JP | 56067385 A | 6/1981 |

(Continued)

OTHER PUBLICATIONS

Nolte919, "Glycerin as a Lawn Fertilizer" (2008) <http://www.biodieseldiscussion.com/forums/archive/index.php?t-14637.html> pp. 1-2.*

*Primary Examiner* — Jennifer A Smith
(74) *Attorney, Agent, or Firm* — Michael B Martin

(57) ABSTRACT

Fertilizers and fertilizer additive compositions and methods are provided. The compositions and methods comprise utilizing by-products from the manufacture of biodiesel and/or fatty alkyl esters, wherein the by-product comprises glycerin, mong, moisture, $C_6$-$C_{24}$ saturated and unsaturated fatty acids, $C_6$-$C_{24}$ saturated and unsaturated fatty acid salts, methyl esters, ethyl esters and combinations thereof.

8 Claims, No Drawings

(56) References Cited

FOREIGN PATENT DOCUMENTS

| | | | |
|---|---|---|---|
| JP | 57098579 | A | 6/1982 |
| JP | 60123593 | A | 7/1985 |
| JP | 4342792 | A | 11/1992 |
| PL | 152875 | B1 | 5/1989 |
| WO | WO 00/34200 | A1 | 6/2000 |
| WO | WO 02/098814 | A1 | 12/2002 |

\* cited by examiner

FERTILIZER AND FERTILIZER ADDITIVE COMPOSITIONS AND METHODS COMPRISING BY-PRODUCTS FROM THE MANUFACTURE OF FATTY ACID ALKYL ESTERS AND/OR BIODIESEL

CROSS-REFERENCE TO RELATED PATENT APPLICATIONS

This application claims priority from provisional application 61/578,792 filed on Dec. 21, 2011, the entire teachings and disclosure of which are incorporated herein by reference thereto.

RELATED APPLICATIONS

The following applications have related subject matter: Ser. No. 11/857,093 filed on Sep. 18, 2007, which in turn was a Continuation-in-part application claiming priority from application Ser. No. 11/561,150 filed on Nov. 17, 2006, now abandoned, which itself was a Continuation-in-part application claiming priority from application Ser. No. 11/490,193 filed Jul. 20, 2006 which issued as U.S. Pat. No. 7,398,935 on Jul. 15, 2008 and application Ser. No. 10/846,218, filed May 14, 2004 which issued as U.S. Pat. No. 7,108,800 on Sep. 19, 2006, the entire teachings and disclosure of which are incorporated herein by reference thereto.

FIELD OF THE INVENTION

This invention relates to fertilizer and fertilizer additive compositions comprising glycerin, fatty acid and fatty acid ester by-products derived from the manufacture of fatty acid alkyl esters and/or biodiesel. More particularly, this invention concerns compositions and methods used in fertilizer applications. The invention is green and is derived from renewable sources. The by-product can comprise C6-C24 fatty acids, glycerin, mong, methanol, moisture, and salts and esters thereof. The invention utilizes crude, or byproduct glycerin, fatty acids, fatty acid methyl esters, fatty acids ethyl esters as a source of carbon. The by-products also provide moisture retention characterization, that are conducive for microbial and plant growth

BACKGROUND OF THE INVENTION

Patents and applications referenced above teach by-products derived from a biodiesel manufacturing process or transesterification reactions involving triglycerides. The referenced patents and patent applications teach applying by-products of the present invention to soil and fertilizers. The present invention teaches utilizing the by-products as fertilizer and/or fertilizer additives to promote fertile soil. The current invention provides a carbon source for bacteria and/or microbials. Microbial activity is essential for fertilizer applications. The present invention can be combined with microbes. The present invention can be combined with enzymes to promote breakdown or decomposition of the by-products. The present invention can be combined with plant seeds.

Moisture or moisture retention is also important for plant growth. The by-products of the present invention possess humectant characteristics. In addition to mitigating water lost, the by-products of the present invention can mitigate or prevent atmospheric loss of nitrogen and/or ammonia used in fertilizer application. Nitrogen and ammonia are used as ingredients of fertilizer compositions, and can evaporate creating greenhouse gas.

BRIEF SUMMARY OF THE INVENTION

This invention relates to a novel and cost effective fertilizer and fertilizer additive compositions and methods. The fertilizer and fertilizer additives comprise by-products from the manufacture of fatty acid alkyl esters and/or biodiesel.

In an embodiment, this invention is fertilizer or fertilizer additive compositions comprising by-products from a biodiesel manufacturing process or transesterification reactions involving triglycerides, wherein said by-product comprises one or more glycerin, mong, methanol, moisture, glycerides, $C_6$-$C_{24}$ fatty acids and salts thereof and one or more $C_6$-$C_{24}$ fatty acid esters. The glycerides include mono-, di- and triglycerides.

In another embodiment, this invention is a method of promoting plant growth comprising applying to soil or fertilizers an effective dosage of said by-products to promote microbial growth and moisture retention, utilizing by-products from a biodiesel manufacturing process or transesterification reactions involving triglycerides, wherein said by-product comprises one or more glycerin, mong, moisture, methanol, glycerides, and one or more $C_6$-$C_{24}$ fatty acids.

In another embodiment, this invention mitigates or prevents emissions of nitrogen and/or ammonia when the nitrogen or ammonia is mixed with the by-products of this invention. Ammonia or nitrogen when released to the atmosphere can create green house gas.

This invention provides a green product derived from renewable resources that can be used as a fertilizer or in fertilizer compositions. Moreover, the present invention is cost-effective as it is a by-product from manufacturing biodiesel and/or fatty acid alkyl esters.

Patent application number 20120316376 teaches using biomass as fertilizer, but does not teach using by-products from a biodiesel manufacturing process or transesterification reactions as fertilizer or fertilizer additive.

Other aspects, objectives and advantages of the invention will become more apparent from the following detailed description when taken in conjunction with the accompanying drawings.

DETAILED DESCRIPTION OF THE INVENTION

This invention provides a unique fertilizer or fertilizer compositions which comprise by-products derived from biodiesel manufacturing processes or transesterification reactions involving triglycerides. The by-product can contain fatty acid esters, especially methyl and ethyl esters, glycerin, mong, moisture, methanol, free fatty acids and their salts, glycerides and inorganic salts. Mong is "matiere organique non glycerol". Mong normally consists of soaps, free fatty acids, and other impurities.

The invention is green chemistry, meaning that it is non-hazardous, non-toxic, biodegradable, environmentally friendly, and/or derived from a renewable source. Renewable sources can include oils from plants, algae, and/or animals, virgin vegetable oils (soybean, corn, mustard, canola, coconut, rapeseed, palm, sunflower, and the like), recycled vegetable oils, poultry offal, fish oils, used cooking oils, and/or trap greases, and the like.

In an embodiment, the fertilizer and fertilizer additives composition are generated from the manufacture of biodiesel. Biodiesel is a cleaner-burning diesel replacement fuel made from natural, renewable sources. For example, biodiesel can include fatty acid alkyl esters used as a cleaner-burning diesel replacement fuel made from sources such as new and used vegetable, plants or algae oils, and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel is typically made through a chemical process called transesterification in which vegetable oil or animal fats are converted to fatty acid alkyl esters and glycerin by-products. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71° C. (160° F.) for a period of about 1 to 8 hours, although some systems are operated at room temperature.

Once the reactions are complete, the oil molecules (e.g. triglycerides) are hydrolyzed and two major products are produced: 1) a crude fatty acid alkyl esters phase (i.e. biodiesel phase) and 2) a glycerin by-product phase. Typically, the crude fatty acid alkyl esters phase forms a layer on top of the denser glycerin by-product phase. Because the glycerin by-product phase is denser than the biodiesel phase, the two can be gravity separated. For example, the glycerin by-product phase can be simply drawn off the bottom of a settling vessel. In some cases, a centrifuge may be employed to speed the separation of the two phases.

The invention by-product can originate from the refining of the crude fatty acid alkyl esters phase and/or the crude glycerin phase during the biodiesel manufacturing process. For example, the crude fatty acid alkyl esters phase typically includes a mixture of fatty acid alkyl esters, water and a fatty acid salts component. These fatty acid salts component generally form a solution with the water phase (e.g. soap water) where they can be further separated from the fatty acid alkyl esters component. Once separated from the fatty acid alkyl esters component, any suitable acid such as, for example, hydrochloric acid can be added to the water phase containing the fatty acid salts component to produce the by-product of the present invention.

Similarly, the crude glycerin phase typically includes a mixture of glycerin, water and a fatty acid salts component. This fatty acid salts component forms a solution or suspension with the water phase where it can be further separated from the glycerin component by adding any suitable acid to recover the invention by-product.

It should be appreciated that the present invention can be derived from the acidulation of any of the biodiesel manufacturing process streams/stages that contain the fatty acid salts component (e.g. soap water) including, for example, the wash water.

In an embodiment, the by-product comprises about 20 percent to about 95 percent by weight of $C_6$-$C_{24}$ fatty acid esters. The fatty acid esters may be saturated or unsaturated. Representative fatty acid esters include methyl and ethyl esters of myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, tetracosenic acid, and combinations thereof.

In an embodiment, the by-product comprises about 5 percent to about 80 percent by weight of $C_6$-$C_{24}$ fatty acids and salts thereof. The fatty acids may be saturated or unsaturated. Representative fatty acids include myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, tetracosenic acid, and combinations thereof.

"Salts" refers to the inorganic base addition salts of the fatty acids described herein. Representative salts include sodium, lithium, potassium, calcium and magnesium salts.

The by-product can further include methanol, ethanol and/or glycerin. In an embodiment, the by-products can contain about 0.01 to about 15 weight percent of said methanol, ethanol and/or glycerin.

The by-products can further include one or more inorganic salts such as, for example, salts (e.g. chlorides and sulfates) of sodium, potassium and/or calcium. In an embodiment, the by-products can contain about 0.05 to about 15 weight percent of the inorganic salts.

Other components can include moisture (e.g. water), and unsaponifiable matter.

In an embodiment, the by-product comprises about 20 to about 95 weight percent of fatty acid methyl esters, about 5 to about 80 weight percent fatty acids and salts thereof and about 5 to about 20 weight percent of one or more components selected from inorganic salts, methanol, ethanol, glycerin, glycerides, unsaponifiable materials and combinations thereof.

The fertilizer and fertilizer additives compositions may suitably be applied to soil and/or any current fertilizer composition.

In some embodiments, the fertilizer and fertilizer compositions are used as food source to promote microbial growth. The present invention can be mixed with other fertilizers.

Typical fertilizers include monoammonium sulfate ("MAP"), diammonium phosphate ("DAP"), trisuperphosphate ("GSTP"), calcium phosphate, ammonium nitrate, potassium nitrate, potassium chloride, potassium sulfate, and the like, and blends thereof. The fertilizer may be in granular, palletized, crushed, compacted, crystalline or prilled form.

In an embodiment, when the invention is mixed with other fertilizers, the concentration of the by-products is less than 50% by weight.

The present invention is not used to control dust from particulate materials.

The present invention can be applied as is or mixed with other fertilizers, plant seeds, and/or microorganisms. The present invention can be applied as a liquid, emulsion, or foam.

The present invention may be applied by any of the known methods of applying a liquid, including spraying, film rolling, and spraying the composition onto a rotary drum.

The crude glycerin phase or by-product glycerin is heavier than water and possesses freeze point depression property. Hence, by-product glycerin can be used in other applications related to separation by density, and balance control. By-product glycerin can be used in road barrier application. Road traffic barriers and crash safety barriers, particularly plastic, portable ones, are generally filled with sand, water or glycol solutions. By-product glycerin offers an improved alternative. Moreover, because by-product glycerin possesses humectant property and is non-combustible when mixed with water, it can be used to prevent fire. An example is to spray by-product glycerin mixed with water onto dry vegetation to prevent forest/vegetation fire or to put out fire.

Changes can be made in the composition, operation, and arrangement of the method of the invention described herein without departing from the concept and scope of the invention as defined in the claims. The present disclosure is an exemplification of the principles of the invention and is not intended to limit the invention to the particular embodiments illustrated. All patents, patent applications, scientific papers, and any other referenced materials mentioned herein or incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein or and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Fertilizer and fertilizer additive compositions for application to soil and fertilizer compositions, said fertilizer and fertilizer additive compositions consisting of by-product glycerin mixed with microorganisms and enzymes wherein the by-product glycerin is derived from a biodiesel manufacturing process or transesterification reactions involving triglycerides and wherein the by-product glycerin further comprises one or more components selected from the group consisting of methanol, sodium chloride, glycerides, $C_6$-$C_{24}$ fatty acids, inorganic salts, mong, unsaponifiable material and water, and wherein said enzymes promote breakdown or decomposition of the by-products.

2. The composition of claim 1, in the form of an aqueous emulsion, liquid or foam.

3. The composition of claim 1 wherein the $C_6$-$C_{24}$ fatty acids are selected from the group consisting of myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, and tetracosenic acid.

4. A fertilizer composition consisting of the composition of claim 1.

5. A fertilizer composition consisting of the composition of claim 1 mixed with other fertilizers.

6. A method of making soil more fertile comprising adding the composition of claim 1 to the soil.

7. A method of mitigating or preventing atmospheric loss of nitrogen and/or ammonia used in fertilizer applications comprising mixing the nitrogen and/or ammonia with a composition according to claim 1.

8. A fertilizer composition consisting of less than 50% of a fertilizer additive composition mixed with other fertilizers, the fertilizer additive composition consisting essentially of by-product glycerin mixed with microorganisms and enzymes wherein the by-product glycerin is derived from a biodiesel manufacturing process or transesterification reactions involving triglycerides and wherein the by-product glycerin further comprises one or more components selected from the group consisting of methanol, sodium chloride, glycerides, $C_6$-$C_{24}$ fatty acids, inorganic salts, mong, unsaponifiable material and water, and wherein said enzymes promote breakdown or decomposition of the by-products.

* * * * *